United States Patent [19]

Tomita et al.

[11] Patent Number: 5,478,884
[45] Date of Patent: Dec. 26, 1995

US005478884A

[54] OXYALKYLENE GROUP-CONTAINING POLYVINYL ALCOHOL RESIN COMPOSITION AND PROCESS FOR THE PRODUCTION OF SHAPED ARTICLES FROM SAID COMPOSITION

[75] Inventors: Munetoshi Tomita; Shinji Noma; Tamae Suzuki, all of Osaka, Japan

[73] Assignee: Nippon Gohsei Kagaku Kogyo Kabushiki Kaisha, Osaka, Japan

[21] Appl. No.: 139,018

[22] Filed: Oct. 21, 1993

[30] Foreign Application Priority Data

Oct. 27, 1992 [JP] Japan .................................. 4-312966
Mar. 22, 1993 [JP] Japan .................................. 5-088036

[51] Int. Cl.$^6$ .................................................. C08L 29/02
[52] U.S. Cl. ............................... 525/58; 525/59; 525/62
[58] Field of Search ............................ 525/58, 60, 59, 525/62

[56] References Cited

U.S. PATENT DOCUMENTS

| | | | |
|---|---|---|---|
| 2,844,570 | 7/1958 | Broderick | 260/91.3 |
| 3,033,841 | 5/1962 | Germain | 260/89.1 |
| 4,369,281 | 1/1983 | Zimmerman et al. | 524/379 |
| 4,614,781 | 9/1986 | Hori et al. | 525/330.6 |
| 4,618,648 | 10/1986 | Marten | 525/60 |
| 4,675,360 | 6/1987 | Marten | 525/60 |
| 4,824,904 | 4/1989 | Aoyama et al. | 525/60 |
| 4,946,720 | 8/1990 | Oishi et al. | 428/354 |
| 5,260,371 | 11/1993 | Chen | 525/60 |

*Primary Examiner*—W. Robinson Clark
*Attorney, Agent, or Firm*—Armstrong, Westerman, Hattori, McLeland & Naughton

[57] ABSTRACT

The invention provides an oxyalkylene group-containing PVA resin composition with an alkali metal acetate content of 0.001~1 weight % and an oxyalkylene group-containing PVA resin composition with an alkali metal acetate content of 0.001~1 weight %, which further contains 0.1~10 moles of an acid with a pKa value of not more than 5.0 per mole of the alkali metal acetate, optionally together with 0.01~5 weight % of a phenol compound which melts at 50°~250° C., a thioether or a phosphite based on the polyvinyl alcohol and/or 0.01~3 weight % of a fatty acid compound based on the polyvinyl alcohol.

6 Claims, No Drawings

OXYALKYLENE GROUP-CONTAINING POLYVINYL ALCOHOL RESIN COMPOSITION AND PROCESS FOR THE PRODUCTION OF SHAPED ARTICLES FROM SAID COMPOSITION

FIELD OF THE INVENTION

The present invention relates to an oxyalkylene group-containing polyvinyl alcohol resin composition providing for improved solvent resistance and thermal stability.

BACKGROUND OF THE INVENTION

Shaped articles of polyvinyl alcohol, particularly those of oxyalkylene group-containing polyvinyl alcohol, are superior to shaped articles of polyolefin or polyester in many performance parameters such as solvent resistance, aroma retention, clarity, oil resistance, antistaticity, oxygen barrier property and warmth retention. Furthermore, such polyvinyl alcohol resin compositions are hydrophilic and either soluble or well-dispersible in water and have been used with advantage in the manufacture of packaging materials for agrochemicals, oils and fats, solvents and so on.

Oxyalkylene group-containing polyvinyl alcohols as such are known polymers and have been described in the following patent literature, among others.

The specifications of U.S. Pat. No. 1,971,662, No. 2,844,570 and No. 2,990,398 disclose oxyalkylene group-containing polyvinyl alcohols obtainable by the addition reaction of ethylene oxide to polyvinyl alcohol.

The specifications of U.S. Pat. No. 3,033,841 and No. 4,369,281 disclose oxyalkylene group-containing polyalkylene glycols obtainable by graft-polymerization of vinyl acetate in the presence of a polyalkylene glycol and subsequent hydrolysis.

The specifications of United States Patent No. 4,618,648 and No. 4,675,360 disclose vinyl alcoholpoly(alkyleneoxy) acrylates and claim that these copolymers can be injection- or extrusion-molded and that the resulting shaped articles are water-soluble and flexible.

Japanese Patent Application Kokai No. 59-1655408 describes a modified polyvinyl alcohol produced by copolymerizing an oxyalkylene group-containing unsaturated monomer with vinyl acetate and saponifying the resulting copolymer. The specification contains an extensive list of possible applications, among which are shaped articles, but is reticent about relevant production technology.

Japanese Patent Application Kokai H-3-203932, filed by the present applicant, discloses a process for melt-molding an oxyalkylene group-containing vinyl alcohol copolymer under substantially anhydrous conditions. The same patent application describes the molding of the copolymer in substantial absence of a plasticizer and its moldability by extrusion or injection molding.

While oxyalkylene group-containing polyvinyl alcohol finds application in the packaging of agrochemicals, oils and fats, solvents, etc. as mentioned above, this application calls for a further improvement in the solvent resistance. The solvent resistance of a shaped article of oxyalkylene group-containing polyvinyl alcohol is primarily dependent on the degree of saponification of the polyvinyl alcohol and the degree of oxyalkylene modification. However, there is a limit to the enhancement of solvent resistance by adjusting the degree of saponification and/or the degree of modification and it is extremely difficult to attain the necessary level of resistance.

Furthermore, the investigation made by the inventors of the present invention revealed that the conventional oxyalkylene group-containing polyvinyl alcohol resin compositions must be further improved in thermal stability as well. Thus, when exposed to intense heat, these compositions become discolored. If they are subjected to prolonged melt-molding, the shaped articles will be discolored and degraded or suffer surface roughening.

Therefore, the object of the present invention is to provide an oxyalkylene group-containing polyvinyl alcohol resin composition providing for improved solvent resistance and thermal stability.

SUMMARY OF THE INVENTION

The oxyalkylene group-containing polyvinyl alcohol composition of the invention comprises:

1. An oxyalkylene group-containing polyvinyl alcohol composition with an alkali metal acetate (a) content of 0.001~1 weight %, preferably 0.001~0.3 weight %.

2. An oxyalkylene group-containing polyvinyl alcohol composition according to 1 which contains 0.1~10 moles of an acid having a pKa value of not more than 5.0 (b) per mole of said alkali metal acetate (a).

3. An oxyalkylene group-containing polyvinyl alcohol resin composition according to 2 which further contains 0.01~5 weight % of at least one compound (c) selected from the group consisting of (cl) phenolic compounds having melting points in the range of 50°~250° C., (c2) thioether compounds and (c3) phosphite compounds based on the oxyalkylene group-containing polyvinyl alcohol.

4. An oxyalkylene group-containing polyvinyl alcohol resin composition according to 3 which further contains 0.01~3 weight % of at least one fatty acid compound (d) selected from the group consisting of (d1) fatty acids of not less than 10 carbon atoms and their salts, (d2) fatty acid amide compounds and (d3) fatty acid ester compounds based on said oxyalkylene group-containing polyvinyl alcohol.

The method of the invention for producing a shaped article comprises melt-molding the oxyalkylene group-containing polyvinyl alcohol resin composition according to 1, 2, 3 or 4.

DETAILED DESCRIPTION OF THE INVENTION

The present invention is now described in detail.

The oxyalkylene group-containing polyvinyl alcohol for use in the present invention can be typically produced by copolymerizing vinyl acetate with a polyoxyalkylene (meth)allyl ether such as polyoxyethylene (meth)allyl ether, polyoxypropylene (meth)allyl ether or the like and, then, saponifying the resultant copolymer.

The copolymerizing ratio of polyoxyalkylene (meth)allyl ether is preferably 0.1~20 mole % and more preferably 0.1~5 mole %, and the degree of condensation of polyoxyalkylene in said polyoxy alkylene (meth)allyl ether is preferably 1~300 and more preferably 3~50. The proportion of the oxyalkylene unit in the whole oxyalkylene group-containing polyvinyl alcohol is preferably 3~40 weight %. This means that there is an optimum range for the degree of localization or non-localization of the oxyalkylene unit in the copolymer and for the length of the oxyalkylene unit constituting the copolymer.

The degree of saponification of vinyl acetate in the oxyalkylene group-containing polyvinyl alcohol is 50~100 mole % and preferably 70~99 mole % and the average degree of polymerization is 150~1500 and preferably 200~1000.

The copolymer may contain, in addition to said polyoxyalkylene (meth)allyl ether, one or more other comonomers such as α-olefins (e.g. ethylene, propylene, long-chain α-olefin, etc.) and ethylenically unsaturated carboxylic acid monomers (e.g. acrylate, methacrylate, acrylonitrile, methacrylonitirle, vinyl chloride, vinyl ether, etc.) in a proportion of about 30 mole % at a maximum.

The polymerization method for the production of said oxyalkylene group-containing polyvinyl alcohol is generally the solution-polymerization method but the suspension polymerization, emulsion polymerization and other polymerization methods can also be employed. The saponification of the polymer can be carried out by alkali saponification, acid saponification and other methods.

The oxyalkylene group-containing polyvinyl alcohol can also be obtained by copolymerizing vinyl acetate with polyoxyethylene (meth)acrylate, polyoxypropylene (meth)acrylate, polyoxyethylene (meth)acrylamide, polyoxypropylene (meth)acrylamide, polyoxypropylene (meth)acrylamide, polyoxyethylene (1-(meth)acrylamide- 1,1-dimethylpropyl) ester, polyoxyethylene vinyl ether, polyoxypropylene vinyl ether, polyoxyethylene allylamide, polyoxypropylene allylamide, polyoxyethylene vinylamide, polyoxypropylene vinylamide or the like and, then, saponifying the resultant copolymer.

Furthermore, the oxyalkylene group-containing polyvinyl alcohol can be obtained by the reaction between an alkylene oxide and polyvinyl alcohol or polymerization of vinyl acetate with polyoxyalkylene glycol and subsequent saponification.

The resultant oxyalkylene group-containing polyvinyl alcohol generally contains about 0.5~2.0 weight % of alkali metal acetate. Therefore, the polyvinyl alcohol is washed with a solvent such as methanol a few times to adjust the alkali metal acetate content. The alkali metal acetate content is controlled at 0.001~1 weight %, preferably 0.001~0.3 weight %.

When the content exceeds 1 weight %, no improvement can be obtained in solvent resistance. On the other hand, it is industrially difficult to reduce the alkali metal acetate content below 0.001 weight %.

The alkali metal acetate content can be determined by titrimetry with N/10 hydrochloric acid using 0.1% methyl orange solution as the indicator.

In a preferred embodiment of the invention, an acid is added to the oxyalkylene group-containing polyvinyl alcohol composition containing the alkali metal acetate within the above range. The acid to be so added should have a pKa value of not more than 5.0 as measured in water at 25° C., thus including inorganic acids such as hydrochloric acid, sulfuric acid, nitric acid, phosphoric acid, etc. and organic acids such as acetic acid, salicylic acid, diphenylcarboxylic acid, hippuric acid, mandelic acid, propionic acid, isophthalic acid, oxalic acid, terephthalic acid, phthalic acid, maleic acid, malonic acid and so on. When an acid with a pKa value of more than 5.0 is used, no improvement in solvent resistance can be expected. The level of addition of such an acid is 0.1~10 moles and preferably 0.5~3 moles per mole of said alkali metal acetate. When the amount of the acid is less than 0.1 mole %, the improvement in solvent resistance is insufficient, while the use of the acid in excess of 10 moles results in an undesirable decrease in solvent resistance. The acid may be added in one dose or in several installments. Provided that the residual amount of the acid will be within the above range, washing with methanol or the like may be carried out after addition of the acid. Instead of methanol washing, washing may be carried out using the very acid or a methanolic solution of the acid.

It has been found that the oxyalkylene group-containing polyvinyl alcohol resin composition of the invention insures not only high resistance to organic solvents but also improved water solubility particularly when it satisfies the following torque ratio:

$T_{60}/T_3$=0.1~10, preferably 1~6 where $T_3$ is the torque value found when said composition was preheated in a Brabender Plasticorder (kneader type W50) at 220° C. for 3 minutes and $T_{60}$ is the torque value found when the above preheating was followed by 60 minutes' compounding at a screw speed of 50 rpm.

Therefore, when a container or other shaped article is manufactured by melt-molding an oxyalkylene group-containing polyvinyl alcohol composition having a torque ratio ($T_{60}/T_3$) in the above range, it can be easily disposed of in the form of an aqueous solution.

It is also preferable that the resultant oxyalkylene group-containing polyvinyl alcohol composition be further supplemented with 0.01~5 weight %, preferably 0.1~0.5 weight %, of at least one compound selected from the group consisting of (c1) phenolic compounds melting between 50° and 250° C., (c2) thioether compounds and (c3) phosphite compounds. When the level of addition is less than 0.01 weight %, no remarkable improvement can be realized in thermal stability, while when it exceeds 5 weight %, the solvent resistance is sacrificed.

Among (c1) phenolic compounds melting in the range of 50°~250° C. are 2,5-di-t-butylhydroquinone, 3,6-di-t-butyl-p-cresol, 4,4'-thiobis-(6-t-butylphenol), 3,2'-methyl-bis(4-methylene-6-t-butylphenol), tetrakis[ methylene-3-(3',5'-di-t-butyl-4'-hydroxyphenylpropionate] methane, octadecyl 3-(3',5'-di-t-butyl-4'-hydroxyphenyl)propionate, 4,4'-thiobis(6-t-butylphenol), N,N'-hexamethylene-bis(3,5-di-t-butyl-4'-hydroxyhydrocinnamide), 1,3,5-trimethyl-2,4,6-tris(3,5-di-t-butyl- 4-hydroxybenzyl)benzene, pentaerythrityl-tetrakis[3-( 3,5-di-t-butyl-4-hydroxyphenyl)propionate], 1,1,3tris( 2-methyl-4-hydroxyl-5-t-butylphenyl)butane, 2-tert-butyl-6-(3-tert-butyl-2-hydroxy-5-methylbenzyl)-4-methylphenyl acrylate, 2-[1-(2-hydroxy-3,5-di-tertpentylphenyl)ethyl] -4,6-di-tert-pentylphenyl acrylate and so on.

Among (c2) thioether compounds are pentaery-thritol-tetrakis(β -laurylthiopropionate), tetrakis[ methylene-3-(dodecylthio)propionate]methane, bis[2-methyl- 4-{3-n-alkylthiopropionyloxy}-5-t-butylphenyl] sulfides and so on.

Among (c3) phosphite compounds are triaryl phosphites such as triphenyl phosphite, tris(p-nonylphenyl) phosphite, tris(2,4-di-t-butylphenyl) phosphite, etc., alkyl aryl phosphites such as monoalkyl diphenyl phosphites, e.g. diphenyl isooctyl phosphite, diphenyl isodecyl phosphite, etc. and dialkyl monophenyl phosphites, e.g. phenyl diisooctyl phosphite, phenyl diisodecyl phosphite, etc., trialkyl phosphites such as triisooctyl phosphite, tristearyl phosphite, etc., tetrakis(2,4-di-t-butylphenyl)-4,4'-biphenylene phosphonite, di-(2,4-di-t-butylphenyl) pentaerythritol diphosphite and so on.

A further improvement in thermal stability can be obtained when said oxyalkylene group-containing polyvinyl alcohol resin composition is supplemented with 0.01–3 weight %, preferably 0.1–0.5 weight %, of a compound selected from the group consisting of (d1) fatty acids of not less than 10 carbon atoms and their salts, (d2) fatty acid amides and (d3) fatty acid esters based on the oxyalkylene group-containing polyvinyl alcohol resin.

The fatty acids of not less than 10 carbon atoms and their salts, mentioned above, include higher fatty acids such as lauric acid, palmitic acid, stearic acid, oleic acid, ricinoleic acid, arachidic acid, behenic acid, erucic acid, etc. and hydroxy-fatty acids such as hydroxystearic acid, hydroxyricinoleic acid, etc., as well as their salts with metals such as magnesium, calcium, strontium, barium, zinc and so on. Particularly preferred and useful are stearic acid, magnesium stearate, calcium stearate, magnesium 12-hydroxystearate and magnesium behenate.

The fatty acid amide compounds mentioned above include fatty acid amides such as stearylamide, palmitylamide, oleylamide, behenylamide, erucanylamide, etc. and alkylenebis-fatty acid amides such as methylenebis-stearylamide, ethylenebis-stearylamide and so on.

The fatty acid ester compounds include fatty acid esters of monohydric alcohols such as butyl stearate, butyl palmitate, etc. and fatty acid esters of polyhydric alcohols such as ethylene glycol monostearate and so on.

In the present invention, blending of the oxyalkylene group-containing polyvinyl alcohol resin with compound (c) or with compound (c) and compound (d) can be carried out by the well-known procedures. Thus, using a melting tank equipped with a stirrer, an extruder or a roll kneader, the above ingredients can be mix-melted to prepare pellets. There is no particularly limitation on the order of blending. The melt-blending temperature is 160°–250° C. and preferably 180°–230° C. While the molding of such pellets can be carried out in the conventional manner, it is also possible to omit preblending of the ingredients and feed them to an extrusion or injection molding machine for blending and molding.

Within the range not contrary to the object of the invention, other polymers can be incorporated in the above resin composition or conversely the above resin composition be added to the other polymer or polymers. In addition, a variety of additives such as a plasticizer, filler, coloring agent, stabilizer, etc. can also be incorporated.

Shaped articles can be manufactured by melt-molding the pelletized resin composition. This melt-molding can be carried out by injection molding, extrusion molding, transfer molding and other molding techniques. The extrusion molding technique comprises blow molding, inflation molding, co-extrusion, extrusion coating and other processes.

The conditions of injection molding may for example be: cylinder temperature about 150°–250° C., die temperature about 10°–100° C., and injection pressure about 500–2000 kg/cm$^2$. The conditions of extrusion molding may for example be die temperature about 150°–250° C., preferably about 180°–230° C. and screw compression zone temperature higher by 5°–30° C. than discharge zone temperature.

There is no particular limitation on the configuration of article that can be manufactured. Thus, bottles, film, sheet, hoses, tubing, trays, bags, fiber, various foamed articles etc. can be manufactured. The shaped articles manufactured in this manner are particularly suitable for the packaging of agrochemicals, oils and fats, solvents and so on.

Aside from the shaped articles, the composition of the invention finds application in a variety of other uses such as hot-melt adhesives, paper finishing agents, packaging materials, stationary goods, office supplies, sanitary goods, medical devices and supplies, agricultural and hortical materials, machine parts and so on.

Furthermore, the oxyalkylene group-containing polyvinyl alcohol of the present invention is of use as a binder or a substrate for a variety of medical test (diagnostic) papers such as pH test paper, urinalysis paper and so on.

The composition of the invention as well as the shaped article made from the composition exhibits excellent solvent resistance and thermal stability in the above-mentioned applications.

EXAMPLES

The following examples are further illustrative of the invention.

Manufacture of shaped articles

Example 1

Polyoxyethylene monoallyl ether (average degree of oxyalkylene condensation=10) and vinyl acetate were copolymerized in methanol in the presence of azobisisobutyronitrile and after the residual monomer was stripped off, a methanolic solution of sodium hydroxide was added for saponification. From the resultant slurry following saponification, the copolymer was separated by filtration. The copolymer was washed 3 times using 5 volumes of methanol based on the apparent volume of polyvinyl alcohol powder to adjust its sodium acetate content to 0.25 weight % and dried to provide an oxyalkylene group-containing polyvinyl alcohol.

The weight average degree of polymerization of this polymer was 480, the copolymerization ratio of polyoxyethylene monoallyl ether was 1.5 mole % and the proportion of oxyalkylene units in the total polymer was 14.1 weight %, the degree of saponification of vinyl acetate was 95 mole %, the sodium acetate content was 0.25 weight %, and $T_{60}/T_3$ was 1.8.

The oxyalkylene group-containing polyvinyl alcohol obtained as above was fed to an extruder and melt-extruded at a temperature of 210° C. to provide a shaped article.

Example 2

To 100 parts by weight of the oxyalkylene group-containing polyvinyl alcohol obtained in Example 1 was added 11 parts by weight of 5% acetic acid-methanol (3 moles per mole of sodium acetate). Then, the procedure of Example 1 was repeated except that said methanol washing was carried out twice to provide a shaped article.

The weight average degree of polymerization was 480, the copolymerization ratio of polyoxyethylene monoallyl ether was 1.5 mole %, the proportion of oxyalkylene units in the total polymer was 14.1 weight %, the degree of saponification of vinyl acetate was 95 mole %, the sodium acetate content was 0.06 weight %, the acetic acid content was 0.3 weight % and $T_{60}/T_3$ was 1.2.

Example 3

To 100 parts by weight of the oxyalkylene group-containing polyvinyl alcohol obtained in Example 1 was added 7.3 parts by weight of 5% phosphoric acid-methanol (2 moles per mole of sodium acetate) and, then, the procedure of Example 1 was repeated except that said methanol washing was carried out twice to provide a shaped article.

The weight average degree of polymerization of this polymer was 480, the copolymerization ratio of polyoxyethylene monoallyl ether was 1.5 mole %, the proportion of oxyalkylene units in the total polymer was 14.1 weight %, the degree of saponification of vinyl acetate was 95 mole %, the sodium acetate content was 0.03 weight %, the phosphoric acid content was 0.2 weight % and $T_{60}/T_3=1.3$.

Example 4

The procedure of Example 1 was repeated except that polyoxyethylene acrylamide monomer (degree of oxyethylene condensation=5) was used in lieu of polyoxyethylene monoally ether monomer to manufacture a shaped article.

The weight average degree of polymerization was 300, the copolymerization ratio of polyoxyethylene acrylamide was 1 mole %, the proportion of oxyalkylene units in the total polymer was 5.6 weight %, the degree of saponification of vinyl acetate was 92 mole %, the sodium acetate content was 0.3 weight %, and $T_{60}/T_3$ was 5.1.

Example 5

To 100 parts by weight of the oxyalkylene group-containing polyvinyl alcohol obtained in Example 4 was added 21.9 parts by weight of 5% acetic acid-methanol (6 moles per mole of sodium acetate) and, then, the procedure of Example 4 was repeated to provide a shaped article. Incidentally, the methanol washing was carried out 3 times using the same volume of the solvent as mentioned above.

The weight average degree of polymerization of this polymer was 300, the copolymerization ratio of polyoxyethylene monoallyl ether was 1 mole % and the proportion of oxyalkylene units in the total polymer was 5.8 weight %, the degree of saponification of vinyl acetate was 92 mole %, the sodium acetate content was 0.05 weight %, the acetic acid content was 0.5 weight % and $T_{60}/T_3$ was 2.0.

Example 6

The procedure of Example 1 was repeated except that polyoxypropylene methacrylamide monomer (degree of oxypropylene condensation=10) was used in lieu of polyoxyethylene monoally ether monomer to manufacture a shaped article.

The weight average degree of polymerization of this polymer was 380, the copolymerization ratio of polyoxypropylene methacrylamide was 1 mole % and the proportion of oxyalkylene units in the total polymer was 13.0 weight %, the degree of saponification of vinyl acetate was 98 mole %, the sodium acetate content was 0.2 weight %, and $T_{60}/T_3$ was 1.2.

Example 7

The procedure of Example 1 was repeated except that polyoxyethylene vinyl ether monomer (degree of oxyethylene condensation=5) was used in lieu of polyoxyethylene monoally ether monomer to manufacture a shaped article.

The weight average degree of polymerization of this polymer was 600, the copolymerization ratio of polyoxyethylene vinyl ether was 5 mole % and the proportion of oxyalkylene units in the total polymer was 23.1 weight %, the degree of saponification of vinyl acetate was 95 mole %, the sodium acetate content was 0.2 weight %, and $T_{60}/T_3$ was 1.7.

Comparative Example 1

A shaped article was obtained by repeating the procedure of Example 1 except that a polymer with a sodium acetate content of 1.0 weight % and a $T_{60}/T_3$ ratio of 0.1 was used.

Comparative Example 2

A shaped article was obtained by repeating the procedure of Example 2 except that a polymer with a sodium acetate content of 0.63 weight % and a $T_{60}/T_3$ ratio of 0.3 was used.

Test Methods and Evaluation Results

The solvent resistance of the shaped articles obtained above was tested as follows. The results are summarized in Table 1.

Solvent resistance

Weight change

Each disk-shaped article, 50 mm in diameter and 3 mm thick, was immersed in toluene for 1 month. The article was then taken out and the solvent was wiped off from its surface. The wiped article was accurately weighed and the % change in weight was calculated by means of the following equation.

Weight change (%)=(weight after immersion—weight before immersion)/(weight before immersion)×100

Dimensional stability

Each disk-shaped article, 50 mm in diameter and 3 mm thick, was dried at 150° C. for 3 hours and the diameter and thickness were measured with calipers. Then, the article was immersed in toluene for 1 month. After the solvent was wiped off from the surface, the diameter and thickness of the article were measured with calipers and the % changes in diameter and thickness were calculated by means of the following equation.

Change in diameter (thickness)(%)=[diameter(thickness) after immersion—diameter(thickness) before immersion]/[diameter(thickness) before immersion]×100

Water Solubility

Each dumbbell-shaped specimen(ASTM D638) was placed in 1 l of water at 50° C. and allowed to stand for 24 hours. Then, the insoluble fraction was filtered off and the dissolution rate was calculated by means of the following equation.

$$\text{Dissolution rate \%} = \frac{\text{Weight of dumbbell before immersion} - \text{weight of insoluble fraction}}{\text{Weight of dumbbell before immersion}} \times 100$$

TABLE 1

|  | $T_{60}/T_3$ | Change in weight (%) | Dimensional stability (%) Diameter | Thickness | Water solubility (%) |
|---|---|---|---|---|---|
| Example 1 | 1.8 | 0.7 | 0.5 | 1.3 | 97.2 |
| Example 2 | 1.2 | 0.3 | 0.2 | 0.9 | 100 |
| Example 3 | 1.3 | 0.1 | 0.1 | 0.2 | 100 |
| Example 4 | 5.1 | 0.8 | 0.6 | 1.2 | 97.1 |
| Example 5 | 2.0 | 0.1 | 0.2 | 0.2 | 98.1 |
| Example 6 | 1.2 | 0.5 | 0.6 | 1.4 | 99.4 |
| Example 7 | 1.7 | 0.6 | 0.5 | 1.3 | 97.8 |
| Comparative Example 1 | 0.1 | 2.1 | 1.2 | 3.8 | 97.6 |
| Comparative Example 2 | 0.3 | 1.5 | 0.9 | 2.9 | 97.8 |

Example 8

Polyoxyethylene monoallyl ether (average degree of oxyalkylene condensation=20) and vinyl acetate were copolymerized in methanol in the presence of azobisisobutyronitrile and after the residual monomer was stripped off, a methanolic solution of sodium hydroxide was added for saponification. From the resultant slurry following saponification, the copolymer was separated by filtration. The copolymer was washed 3 times using 5 volumes of methanol based on the apparent volume of polyvinyl alcohol powder, followed by addition of 1.5 equivalents of acetic acid relative to sodium acetate. Then, the polymer was further washed twice using 5 volumes of methanol to adjust its sodium acetate content to 0.07 weight % and acetic acid content to 0.026 weight % and dried to provide an oxyalkylene group-containing polyvinyl alcohol resin (hereinafter referred to as EO-PVA).

The weight average degree of polymerization of this polymer was 270, the copolymerization ratio of polyoxyethylene monoallyl ether was 1.0 mole % and the proportion of oxyalkylene units in the total polymer was 16.1 weight %, the degree of saponification of vinyl acetate was 96 mole %, the sodium acetate content was 0.07 weight %, and the acetic acid content was 0.026 weight %.

One hundred (100) parts of the above EO-PVA and 0.3 part of pentaerythrityl tetrakis[3-(3,5-di-t-butyl- 4-hydroxyphenyl)propionate] were fed to a biaxial extruder equipped with a round die and extruded at 210° C. to provide a pelletized resin composition. The torque ratio ($T_{60}/T_3$) was 1.5. The solvent resistance and thermal stability of this resin composition were evaluated. The results are shown in Table 2.

Determination of Solvent Resistance

The pelletized composition was injection-molded under the conditions indicated below to produce a disk measuring 50 mm in diameter and 3 mm in thickness and after cooling in a desiccator to prevent absorption of moisture, the disk was accurately weighed with a precision balance. Three disk specimens were immersed in gasoline or toluene (1 disk per 200 ml of solvent) and allowed to stand under tight coverage at 20° C. for 30 days. The disk was then taken out and the solvent droplets on the surface were wiped off with filter paper. The disk was then weighed accurately with a precision balance and the percent change in weight was determined.

Weight change (%)=(weight after immersion—weight before immersion)/(weight before immersion)×100

(Conditions of injection molding)
Injection molding machine: Nippon Seikosho N100 screw type automatic injection molder
Screw mixing temperature: 220° C.
Die temperature: 30° C.
Injection pressure: 1000 kg/cm$^2$
Molding cycle: 20 seconds

Determination of Thermal Stability

The pelletized composition was fed to a Plasticorder (kneader type) in which it was melted at 220° C. and compounded at a screw speed of 20 rpm for 10 minutes. The melt flow index (MFI) was determined before and after compounding and the thermal stability was evaluated.

The MFI was measured using Toyo Seiki Melt Indexer (nozzle 2.095 mm⌀×8 mm) under a load of 2160 g at 210° C.

| | |
|---|---|
| 0.85<A<1 | o |
| 0.7<A≦0.85 | △ |
| A≦0.7 | x |

A=MFI value after compounding/MFI value before compounding

Evaluation of Water Solubility

The water solubility was evaluated by the procedure described hereinbefore.

Example 9

One hundred (100) parts of the following EO-PVA was melt-blended with 0.5 part of 1,1,3-tris(2-methyl- 4-hydroxy-5-t-butylphenyl)butane and an experiment was performed as in Example 8. The results are shown in Table 1.

EO-PVA

Average degree of polymerization: 350

Average degree of saponification: 96 mole %

Copolymerization ratio of polyoxypropylene monoallyl ether (degree of oxypropylene condensation=10):2.5 mole %

Proportion of oxyalkylene units in total polymer: 24.0 weight %

Sodium acetate content: 0.04 weight %

Acetic acid content: 0.020 weight % (0.7 mole per mole of sodium acetate)

Example 10

One hundred (100) parts of the following EO-PVA, 0.3 part of 1,1,3-tris(2-methyl-4-hydroxy-5-t-butylphenyl)butane and 0.2 part of magnesium stearate were melt-blended and an experiment was performed as in Example 8. The results are shown in Table 2.

EO-PVA

Average degree of polymerization: 420

Average degree of saponification: 97 mole %

Copolymerization ratio of polyoxyethylene monoallyl ether (degree of oxyethylene condensation=5): 3.5 mole %

Proportion of oxyalkylene units in total polymer: 14.4 weight %

Sodium acetate content: 0.03 weight %

Acetic acid content: 0.0066 weight % (0.3 mole per mole of sodium acetate)

Example 11

The EO-PVA described below was prepared by using phosphoric acid in lieu of acetic acid in otherwise the same manner as Example 8.

One hundred (100) parts of the EO-PVA was melt-blended with 0.2 part of pentaerythrityl tetrakis[3-( 3,5-di-t-butyl-4-hydroxyphenyl)propionate, 0.2 part of di-(2,4-di-t-butylphenyl) pentaerythritol diphosphite and 0.2 part of calcium stearate and an experiment was carried out as in Example 8. The results are shown in Table 2.

EO-PVA

Average degree of polymerization: 500

Average degree of saponification: 95 mole %

Copolymerization ratio of polyoxyethylene acrylamide (degree of oxyethylene condensation=30): 1.0 mole %

Proportion of oxyalkylene units in total polymer: 22.2 weight %

Sodium acetate content: 0.03 weight %

Phosphoric acid content: 0.036 weight % (1.0 mole per mole of sodium acetate)

Example 12

The following EO-PVA was prepared by using phosphoric acid in lieu of acetic acid in otherwise the same manner as Example 8. One hundred (100) parts of this EO-PVA was melt-blended with 0.2 part of pentaerythrityl tetrakis[3-(3, 5-di-t-butyl-4-hydroxyphenyl)propionate], 0.1 part of pentaerythrityl tetrakis(β-laurylthiopropionate) and 0.3 part of 12-hydroxystearic acid and an experiment was carried out as in Example 8. The results are shown in Table 2.

EO-PVA

Average degree of polymerization: 570

Average degree of saponification: 95 mole %

Copolymerization ratio of polyoxyethylene vinyl ether (degree of oxyethylene condensation=15): 2.0 mole %

Proportion of oxyalkylene units in total polymer: 22.3 weight %

Sodium acetate content: 0.08 weight %

Phosphoric acid content: 0.286 weight % (3 moles per mole of sodium acetate)

Example 13

The following EO-PVA was prepared by using phosphoric acid in lieu of acetic acid in otherwise the same manner as Example 8. One hundred (100) parts of this EO-PVA was melt-blended with 0.4 part of pentaerythrityl tetrakis[3-(3, 5-di-t-butyl-4-hydroxyphenyl)propionate], 0.1 part of tris(2, 4-di-t-butylphenyl) phosphite and 0.1 part of 12-hydroxystearic acid and an experiment was carried out as in Example 8. The results are shown in Table 2.

EO-PVA

Average degree of polymerization: 620

Average degree of saponification: 94 mole %

Copolymerization ratio of polyoxypropylene vinyl ether (degree of oxyethylene condensation=20): 1.5 mole %

Proportion of oxyalkylene units in total polymer: 27.2 weight %

Sodium acetate content: 0.05 weight %

Phosphoric acid content: 0.012 weight % (0.2 mole per mole of sodium acetate)

Example 14

One hundred (110) parts of the following EO-PVA was melt-blended with 0.3 part of 1,3,5-trimethyl- 2,4,6-tris(3, 5-di-t-butyl-4-hydroxybenzyl)benzene, 0.2 part of tris(2,4-di-t-butylphenyl) phosphite and 0.05 part of stearic acid and an experiment was performed as in Example 8. The results are shown in Table 2.

EO-PVA

Average degree of polymerization: 700

Average degree of saponification: 92 mole %

Copolymerization ratio of polyoxypropylene methacrylamide (degree of oxyethylene condensation=10): 2.0 mole %

Proportion of oxyalkylene units in total polymer: 19.4 weight %

Sodium acetate content: 0.02 weight %

Acetic acid content: 0.044 weight % (3 moles per mole of sodium acetate)

Comparative Example 3

The procedure and experiment of Example 8 were repeated except that the sodium acetate content was 0.7 weight %. The results are shown in Table 2.

Comparative Example 4

The procedure and experiment of Example 8 were repeated except that pentaerythrityl tetrakis[3-(3,5-di-t-butyl- 4-hydroxyphenyl)propionate was used in a proportion of 0.005 part by weight. The results are shown in Table 2.

Comparative Example 5

The procedure and experiment of Example 8 were repeated except that pentaerythrityl tetrakis[3-3,5-di-t-butyl-4-hydroxyphenyl)propionate was used in a proportion of 8 parts by weight. The results are shown in Table 2.

TABLE 2

|  | | Solvent resistance (%) | | Thermal stability | Water solubility (%) |
| --- | --- | --- | --- | --- | --- |
|  | $T_{60}/T_3$ | Toluene | Gasoline | | |
| Example 8 | 1.5 | +0.7 | +0.5 | o | 99.6 |
| Example 9 | 1.3 | +0.6 | +0.5 | o | 100 |
| Example 10 | 1.4 | +0.4 | +0.3 | o | 99.5 |
| Example 11 | 1.3 | +0.1 | +0.1 | o | 100 |
| Example 12 | 1.1 | +0.1 | +0.1 | o | 100 |
| Example 13 | 1.6 | +0.1 | +0.1 | o | 98.6 |
| Example 14 | 2.7 | +0.2 | +0.2 | o | 97.3 |
| Comparative Example 3 | 10.8 | +2.1 | +1.8 | x | 71.0 |
| Comparative Example 4 | 1.9 | +1.7 | +1.6 | x | 97.2 |
| Comparative Example 5 | 2.5 | +2.8 | +3.5 | Δ | 97.1 |

What is claimed is:

1. A water-soluble oxyalkylene group-containing polyvinyl alcohol resin composition having a torque ratio $T_{60}/T_3$ of 1 to 6 comprising:

a water-soluble oxyalkylene group-containing polyvinyl alcohol obtained by copolymerizing vinyl acetate with a polyoxyalkylene mono(meth) allyl ether, wherein the copolymerization ratio of polyoxyalkylene mono(meth) allyl ether is 0.1 to 5 mole %, the average degree of condensation of polyoxyalkylene in said polyoxyalkylene mono(meth)allyl ether is 4 to 50, the proportion of the oxyalkylene unit in the whole oxyalkylene group-containing polyvinyl alcohol is 3 to 40 weight %; and saponifying the resultant copolymer, the average degree of saponification of the vinyl acetate in the copolymer being 70 to 100 mole %;

0.001 to 0.3% of an alkali metal acetate based on the weight of the oxyalkylene group-containing polyvinyl alcohol; and 0.1 to 10 moles of an acid having a pKa value of not more than 5.0 per mole of the alkali metal acetate.

2. An oxyalkylene group-containing polyvinyl alcohol resin composition according to claim 1 additionally comprising:

0.01 to 5%, based on the weight of the oxyalkylene group-containing polyvinyl alcohol, of at least one compound selected from the group consisting of phenolic compounds having melting points in the range of 50° to 250° C., thioether compounds and phosphite compounds.

3. An oxyalkylene group-containing polyvinyl alcohol resin composition according to claim 2 additionally comprising:

0.01 to 3%, based on the weight of the oxyalkylene group-containing polyvinyl alcohol, of at least one fatty acid compound selected from the group consisting of fatty acids or their salts having not less than 10 carbon atoms, fatty acid amides and fatty acid esters.

4. A process for producing a shaped article comprising melt-molding the oxyalkylene group-containing polyvinyl alcohol resin composition of claim 1.

5. A process for producing a shaped article comprising melt-molding the oxyalkylene group-containing polyvinyl alcohol resin composition of claim 2.

6. A process for producing a shaped article comprising melt-molding the oxyalkylene group-containing polyvinyl alcohol resin composition of claim 3.

* * * * *